(12) United States Patent
Okada

(10) Patent No.: US 7,242,849 B2
(45) Date of Patent: Jul. 10, 2007

(54) BROADCAST VIDEO IMAGE RECORDING APPARATUS

(75) Inventor: Yoshiyuki Okada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1036 days.

(21) Appl. No.: 10/382,895

(22) Filed: Mar. 7, 2003

(65) Prior Publication Data

US 2003/0161611 A1    Aug. 28, 2003

Related U.S. Application Data

(62) Division of application No. 09/102,149, filed on Jun. 22, 1998, now Pat. No. 7,095,949.

(30) Foreign Application Priority Data

Feb. 13, 1998    (JP) .................................. 10-31214

(51) Int. Cl.
    *H04N 5/91* (2006.01)
(52) U.S. Cl. ........................... 386/69; 386/46; 386/125
(58) Field of Classification Search .................... 386/1, 386/46, 55, 69, 83, 109, 125, 126; 360/6, 360/7; 369/83, 124.1, 124.14; 455/166.2, 455/184.1, 186.1, 2.01
    See application file for complete search history.

(56) References Cited

U.S. PATENT DOCUMENTS

| | | | |
|---|---|---|---|
| 4,682,370 A | * | 7/1987 | Matthews ................ 455/166.2 |
| 4,729,044 A | | 3/1988 | Kiesel |
| 4,982,390 A | * | 1/1991 | Tanaka ........................ 369/83 |
| 5,051,845 A | | 9/1991 | Gardber et al. |
| 5,241,428 A | | 8/1993 | Goldwasser et al. |
| 5,335,079 A | | 8/1994 | Yuen et al. |
| 5,371,551 A | | 12/1994 | Logan et al. |
| 5,438,423 A | | 8/1995 | Lynch et al. |

(Continued)

FOREIGN PATENT DOCUMENTS

DE    9001019.1    7/1991

(Continued)

OTHER PUBLICATIONS

U.S. Patent No. 5,241,428, German Utility-model Patent No. 9001019.1 and German Patent Publication No. 4126371 were cited in the Notice of Opposition dated Feb. 18, 2004, which were received on Mar. 1, 2004.

(Continued)

*Primary Examiner*—James J. Groody
*Assistant Examiner*—Christopher Onuaku
(74) *Attorney, Agent, or Firm*—Staas & Halsey LLP

(57) ABSTRACT

A broadcast video image recording apparatus for recording broadcast video image data has a first storage unit for storing broadcast video image data, a second storage unit for storing video image data to be played back, and a control unit for searching the first storage unit for video image data which has been indicated, and storing the indicated video image data in the second storage unit. Broadcast video images are stored in the first storage unit at all times, and video images stored in the first storage unit are read and stored in the second storage unit at a time indicated for recording. Therefore, video images that have been broadcast in the past can be recorded.

5 Claims, 15 Drawing Sheets

U.S. PATENT DOCUMENTS

| | | | |
|---|---|---|---|
| 5,488,409 A | 1/1996 | Yuen et al. | |
| 5,630,006 A | 5/1997 | Hiragama et al. | |
| 5,696,868 A | 12/1997 | Kim et al. | |
| 5,701,383 A | 12/1997 | Russo et al. | |
| 5,825,967 A | 10/1998 | Stewart et al. | |
| 6,301,427 B1 * | 10/2001 | Kazo | 386/46 |
| 6,901,209 B1 * | 5/2005 | Cooper et al. | 386/109 |

FOREIGN PATENT DOCUMENTS

| | | |
|---|---|---|
| DE | 41 26 371 | 8/1991 |
| EP | 726574 A2 | 8/1996 |
| JP | 4-501345 | 3/1992 |
| JP | 7-264529 | 10/1995 |
| JP | 9-154784 | 6/1997 |
| JP | 9-292169 | 11/1997 |
| WO | WO 92/22983 | 12/1992 |

OTHER PUBLICATIONS

U.S. Patent No. 5,701,383 was cited in the Summons to the Oral Proceedings dated Mar. 21, 2005, which was received on Apr. 7, 2005.

* cited by examiner

FIG. 5

Primary storage management table 14
(Primary recording address)

| | TIME | PRIMARY RECORDING ADDRESS |
|---|---|---|
| | 9:00 | 0 |
| Start of primary read → | 9:01 | 1 |
| | 9:02 | 2 |
| | ... | ... |
| End of primary read → | 9:14 | 14 |
| | 9:15 | 15 |
| On primary write Present time : 9:16 → | 7:16 | 16 |
| | ... | ... |
| | 8:59 | 119 |

Secondary storage management table 15
(Secondary recording address)

| TIME | SECONDARY RECORDING ADDRESS | IS RECORDED ? |
|---|---|---|
| 9:01 | 0' | YES |
| 9:02 | 1' | YES |
| 9:03 | 2' | YES |
| ... | ... | ... |
| 9:14 | 13' | YES |
| | 14 | NO |
| | 15 | NO |
| ... | ... | ... |
| | 119' | NO |

15-1

| NAME OF RECORD | TIME | SECONDARY RECORDING ADDRESS |
|---|---|---|
| Record-1 | 14 minuites | 0'-13' |
| ... | ... | ... |

FIG. 10

VIEW / PLAYBACK LIST

| Order | Day | CH | Start time | End time | Program title | Character name | Genre |
|---|---|---|---|---|---|---|---|
| 1 | SUN | 6 | 8:30 | 10:00 | $$$ | AAA | Information |
| 2 | SUN | 8 | 18:30 | 19:00 | !!! | BBB | Anime |
| 3 | MON | 10 | 22:00 | 23:15 | ### | CCC | News |
| 4 | · | · | · | · | · | · | · |
| 5 | · | · | · | · | · | · | · |
| 6 | · | · | · | · | · | · | · |

New registration →

MTF
Registration again

FIG. 11

VIEW / PLAYBACK LIST

| Order | Day | CH | Start time | End time | Program title | Character name | Genre |
|---|---|---|---|---|---|---|---|
| 1 | SUN | 6 | 8:30 | 10:00 | $$$ | AAA | Information |
| 2 | SUN | 8 | 18:30 | 19:00 | !!! | BBB | Anime |
| 3 | MON | 10 | 22:00 | 23:15 | ### | CCC | News |
| 4 | . | . | . | . | . | . | . |
| 5 | . | . | . | . | . | . | . |
| 6 | . | . | . | . | . | . | . |

↓ New registration

Transport
Registration again ←→

FIG. 12

VIEW / PLAYBACK LIST

| Order | Day | CH | Start time | End time | Program title | Character name | Genre | Frequency |
|---|---|---|---|---|---|---|---|---|
| 1 | SUN | 6 | 8:30 | 10:00 | $$$ | AAA | Information | 50 |
| 2 | SUN | 8 | 18:30 | 19:00 | !!! | BBB | Anime | 30 |
| 3 | MON | 10 | 22:00 | 23:15 | ### | CCC | News | 10 |
| 4 | . | . | . | . | . | . | . | 5 |
| 5 | . | . | . | . | . | . | . | 3 |
| 6 | . | . | . | . | . | . | . | 1 ← New registration |

FIG. 13

| METHOD | NEW REGISTRATION | UPDATE |
|---|---|---|
| MTF | Register in a location of highest priority | Move to the location of highest priority |
| TRANSPORT | Register in a location of lowest priority | Exchange for an adjacent program of higher priority |
| FREQUENCY ORDER | Register in a location of lowest priority | Count up frequency 「+1」 update depending on frequency comparison |

BROADCAST VIDEO IMAGE RECORDING APPARATUS

This application is a divisional of application Ser. No. 09/102,149, filed Jun. 22, 1998, now U.S. Pat. No. 7,095,949.

BACKGROUND OF THE INVENTION

1. Field of the Invention

The present invention relates to a broadcast video image recording apparatus for recording television video image data to be broadcast in a recording unit.

2. Description of the Related Art

Attempts are being made to digitize television video images in view of recent tendencies to combine television and computer technologies and employ much more channels in digital broadcasting services than analog broadcasting services. It is possible to transmit 4 to 8 channels in digital broadcasting services using the bandwidth of one analog broadcasting channel. Such digital television video image transmission results in a reduction in the cost and an increase in the image quality. In addition, it is possible to obtain digital video image information from various information sources including satellite broadcasting services, ground wave broadcasting services, cable television broadcasting services, the Internet, etc. As a result, systems for recording video images are required to have diversified functions in order to record digital video image information from those various information sources.

FIG. 15 of the accompanying drawings shows an operation sequence of a conventional system for recording digital video images.

There has been proposed a system, combined with broadcasting station services, for recording digital video images. For example, the Science & Technical Research Laboratories of NHK (NIHON HOSO KYOKAI) have proposed ISTV (Integrated Services TV) based on the home server technology. The ISTV allows a TV receiver to automatically select and record various items of information indicated by the user, including news, weather forecasts, programs, program guides, etc. that are delivered from broadcasting stations. The recorded video images can be viewed anytime whenever the user wants.

The ISTV services offer various functions as described below. The first function automatically receives news, television newspapers, programs, etc. altogether for the user to see at any desired times.

The second function automatically updates news, weather forecasts, etc. that are broadcast at certain times at certain intervals.

According to the third function, if a genre, theme, or a character which is of interest to the user is designated in advance, then programs and other broadcast information are automatically filtered on the basis of index data attached thereto, and selectively stored.

The operation sequence of the conventional system for recording digital video images will be described below with reference to FIG. 15. Numerals each with a prefix S represent step numbers.

(S1) First, the user manually indicates a program to be recorded.

(S2) Broadcast video images are inputted.

(S3) The program to be recorded is selected from the inputted broadcast video images based on the indicated details entered instep S1. If the program is to be recorded, then control proceeds to step S4. If the program is not to be recorded, then control goes back to step S2.

(S4) The indicated program is recorded.

(S5) The user indicates whether the recorded program is to be played back or not. If not to be played back, then control goes back to step S2.

(S6) The recorded program is played back. The user can now view the recorded program.

The conventional system is capable of recording programs that have been indicated.

However, the conventional system is unable to record any programs that have been broadcast in the past. For example, when a program has already started to be broadcast beyond the proper timing to record the program, or when the user wants to view a program once again after viewing the program as it is broadcast, the conventional system cannot record those programs.

SUMMARY OF THE INVENTION

It is an object of the present invention to provide a broadcast video image recording apparatus capable of recording video images broadcast before the user indicates video images for recording.

Another object of the present invention to provide a broadcast video image recording apparatus capable of recording video images that have been broadcast in the past.

To achieve the above objects, a broadcast video image recording apparatus for recording broadcast video image data has a first storage unit for storing broadcast video image data, a second storage unit for storing video image data to be played back, and a control unit for searching the first storage unit for video image data which has been indicated, and storing the indicated video image data in the second storage unit.

Broadcast video images are stored in the first storage unit at all times, and video images stored in the first storage unit are read and stored in the second storage unit at a time indicated for recording. Therefore, video images that have been broadcast in the past can be recorded. Even if a recording time gets behind schedule, desired broadcast video images which have been stored in the first storage unit can be transferred from the first storage unit to the second storage unit at the delayed time. Therefore, the desired broadcast video images can be recorded in the second storage unit.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principle of the invention, in which:

FIG. 5 is a diagram of management tables of the broadcast video image recording apparatus shown in FIG. 2;

FIG. 10 is a diagram illustrative of a first list updating process of the list processing sequence shown in FIG. 9;

FIG. 11 is a diagram illustrative of a second list updating process of the list processing sequence shown in FIG. 9;

FIG. 12 is a diagram illustrative of a third list updating process of the list processing sequence shown in FIG. 9;

FIG. 13 is a diagram showing the list updating processes;

DETAILED DESCRIPTION OF THE PREFERRED EMBODIMENTS

Figure 1:
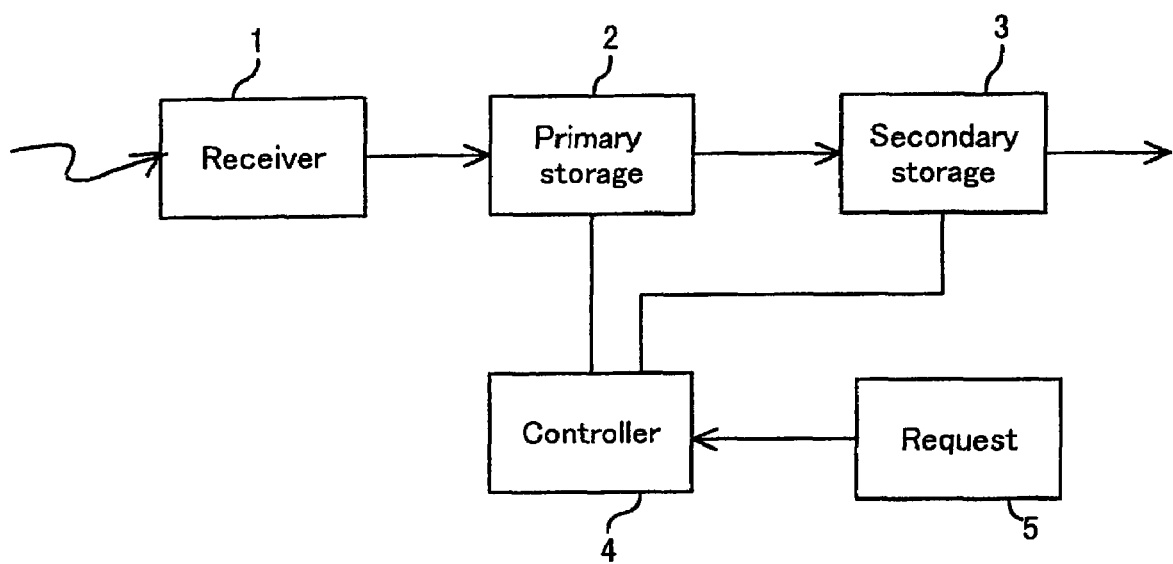
FIG. 1 is a block diagram showing the principles of the present invention.

FIG. 1 shows in block form the principles of the present invention.

As shown in FIG. 1, a receiver unit 1 receives video images that have been broadcast. A primary storage unit 2 stores all the video images that have been received by the receiver unit 1. A secondary storage unit 3 stores those video images which have been indicated, of all the video images that have been stored in the primary storage unit 2. The user manually operates a request unit 4 to indicate video images. The request unit 4 has a playback button and numerical keys for indicating a channel and a time.

A control unit 5 controls the primary storage unit 2 to store all the video images that have been received by the receiver unit 1. The control unit 5 also controls the secondary storage unit 3 to store those video images that are indicated by the user through the request unit 4. The control unit 5 further plays back the video images stored in the secondary storage unit 3 based on a playback instruction from the request unit 4.

Figure 2:
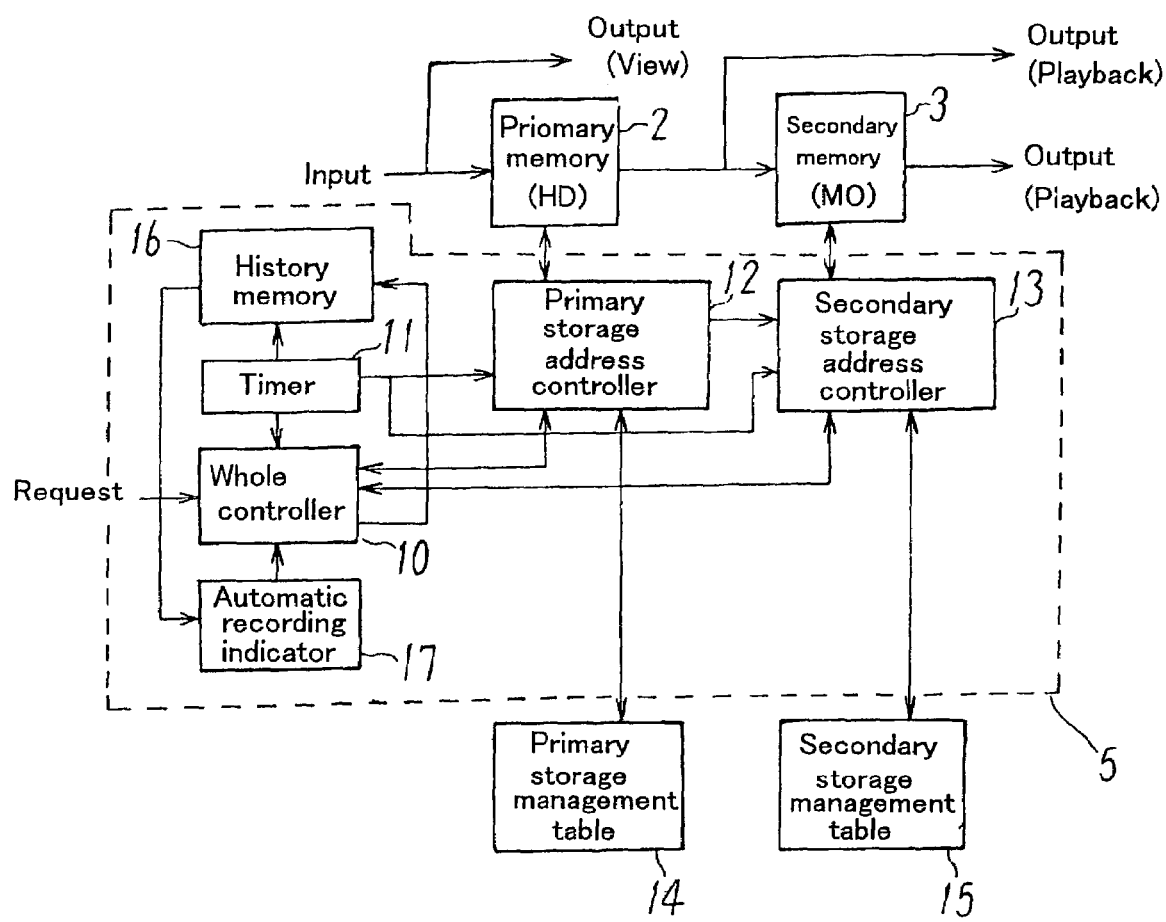
FIG. 2 is a block diagram of a broadcast video image recording apparatus according to an embodiment of the present invention.

FIG. 2 shows in block form a broadcast video image recording apparatus according to an embodiment of the present invention.

As shown in FIG. 2, the broadcast video image recording apparatus has a primary storage unit (memory) 2 comprising a hard disk unit and a secondary primary storage unit (memory) 3 comprising an optical disk unit.

The broadcast video image recording apparatus also has a control unit 5 comprising a processor. The control unit 5 includes a whole controller 10 for controlling a primary storage address controller 12 and a secondary storage address controller 13 to execute a primary storing process, a secondary storing process, and a playback process. The control unit 5 also includes a timer 11 for measuring time.

The primary storage address controller 12 serves to control recording addresses/playback addresses of the primary storage unit 2. The secondary storage address controller 13 serves to control recording addresses/playback addresses of the secondary storage unit 3.

The broadcast video image recording apparatus also has a primary storage management table 14 for storing recording addresses and times of the primary storage unit 2, and a secondary storage management table 15 for storing recording addresses and times of the secondary storage unit 3.

The control unit 5 further includes a view/playback history unit 16 for holding a history of view requests/playback requests from a request unit 4, and an automatic recording indicator 17 for automatically indicating recording sessions based on the history held by the view/playback history unit 16.

The whole controller 10, the timer 11, the primary storage address controller 12, the secondary storage address controller 13, the view/playback history unit 16, and the automatic recording indicator 17 are actually functions that are performed by the control unit 5.

Figure 3:
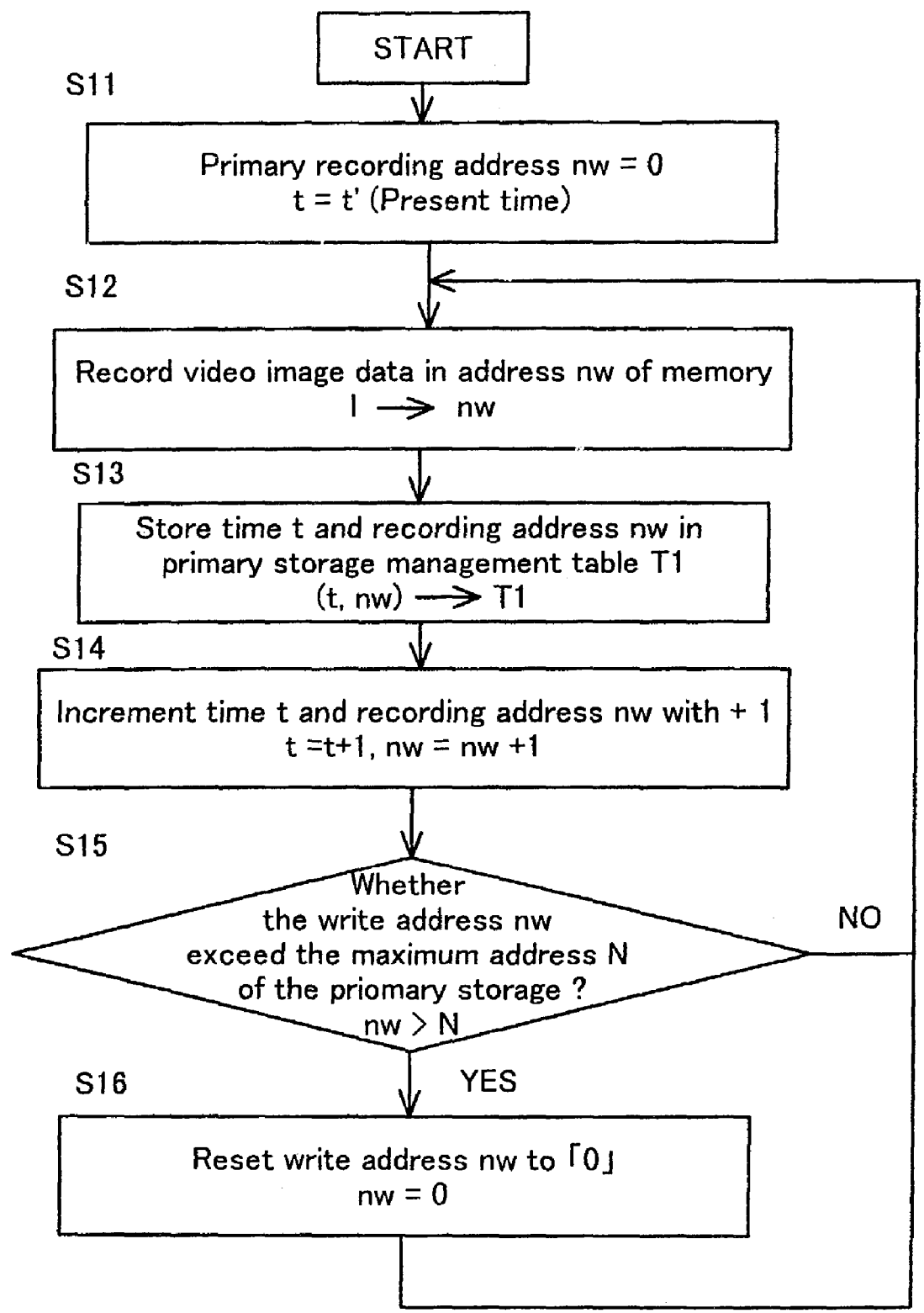
FIG. 3 is a flowchart of a primary storing process of a control unit of the broadcast video image recording apparatus shown in FIG. 2.

The whole controller 10 uses the timer 11, the primary storage address controller 12, and the primary storage management table 14 to store video image data that are received all the times in the primary storage unit 2. Irrespective of whether there is a request from the user or not, the whole controller 10 increments recording addresses of the primary storage unit 2 in synchronism with the timer 11 to store video image data in the primary storage unit 2 according to an FIFO (First-In-First-Out) sequence. Such a primary storing process will be described below with reference to FIG. 3. Numerals each with a prefix S represent step numbers.

(S11) The recording (write) address "nw" in the primary storage unit 2 is initialized to "0", and a time "t" is initialized to a time "t" of the timer 11.

(S12) Video image data for every minute is recorded at the corresponding write address "nw" in the primary storage unit 2. According to MPEG2, video image data for one minute has a size of about 60 Mbytes.

(S13) In order to manage the recorded video image data, the time "t" and the write address "nw" for the recorded video image data are stored in the primary storage management table 14 as shown in FIG. 5.

(S14) The time "t" is incremented and the write address "nw" is incremented in synchronism with the timer 11.

(S15) Since the primary storage unit 2 stores video image data according to the FIFO sequence, it is decided whether the write address "nw" has exceeded the maximum address "N" of the primary storage unit 2 or not. If the write address "nw" has not exceeded the maximum address "N", then control returns to step S12.

(S16) If the write address "nw" has exceeded the maximum address "N", then the write address "nw" is reset to "0", and control returns to step S12.

In this manner, video image data that has been broadcast is recorded at all times in the primary storage unit 2 according to the FIFO sequence.

Then, the video image data recorded in the primary storage unit 2 is selectively read into the secondary storage unit 3 in response to a recording request. The whole controller 10 uses the timer 11, the primary storage address controller 12, the primary storage management table 14, the secondary storage address controller 13, and the secondary storage management table 15 to store the video image data that has been stored in the primary storage unit 2. Such a secondary storing process will be described below with reference to FIG. 4. Numerals each with a prefix S represent step numbers.

(S21) The playback (read) address "nw" in the primary storage unit 2 is set to "nr", and the recording (write) address "nw"' in the secondary storage unit 3 is set to "0".

(S22) The whole controller 10 decides whether there is a secondary recording request from the request unit 4.

(S23) For recording video image data in the secondary storage unit 3, the user indicates a start time "ts" and an end time "te" for desired video image data recorded in the primary storage unit 2, from the request unit 4. The start time "ts" and the end time "te" are held in the secondary storage management table 15.

(S24) In order to check if the desired video image data has been recorded in the primary storage unit 2, it is decided whether the start time "Its" and the recording (write) address "nw" corresponding thereto are stored in the primary storage management table 14 or not. If the start time "ts" and the recording (write) address "nw" are not stored in the primary storage management table 14, then it is judged that the desired video image data has not been recorded, and control goes to step S25. If the start time "ts" and the recording (write) address "nw" are stored in the primary storage management table 14, then it is judged that the desired video image data has been recorded, and control goes to step S26.

(S25) Control waits for one minute, and then returns to step S24.

(S26) The playback (read) address "nr" in the primary storage unit 2 is set to the recording (write) address "nw" held in the primary storage management table 14.

(S27) As shown in FIG. 5, in order to record the video image data for one minute from the primary storage unit 2 into the secondary storage unit 3, the data at the playback (read) address "nr" in the primary storage unit 2 is recorded at the recording (write) address "nw" in the secondary storage unit 3.

(S28) As shown in FIG. 5, the time "ts", the recording (write) address "nw'" in the secondary storage unit 3, and information indicative of whether there is recorded data or not are held in the secondary storage management table 15.

(S29) The time "ts", the playback (read) address "nr", and the recording (write) address "nw" are incremented each by "+1" in synchronism with the timer 11.

(S30) It is decided whether the recording (write) address "nw" has exceeded the maximum address "IN" of the secondary storage unit 3 or not. If the recording (write) address "nw'" has exceeded the maximum address "IN" of the secondary storage unit 3, then control returns to step S31. If the recording (write) address "nw" has not exceeded the maximum address "N" of the secondary storage unit 3, then control proceeds to step S32.

(S31) The recording (write) address "nw," is reset to "0".

(S32) It is decided whether the time "ts" has exceeded the end time "te" or not. If the time "ts" has exceeded the end time "te", then the requested recording is over, and control goes back to step S22. If the time "ts" has not exceeded the end time "te", then since requested recording is not over, control returns to step S24.

In this manner, the video image data or program having the start and end times that have been indicated by the user is transferred from the primary storage unit 2 to the secondary storage unit 3.

Figure 6:
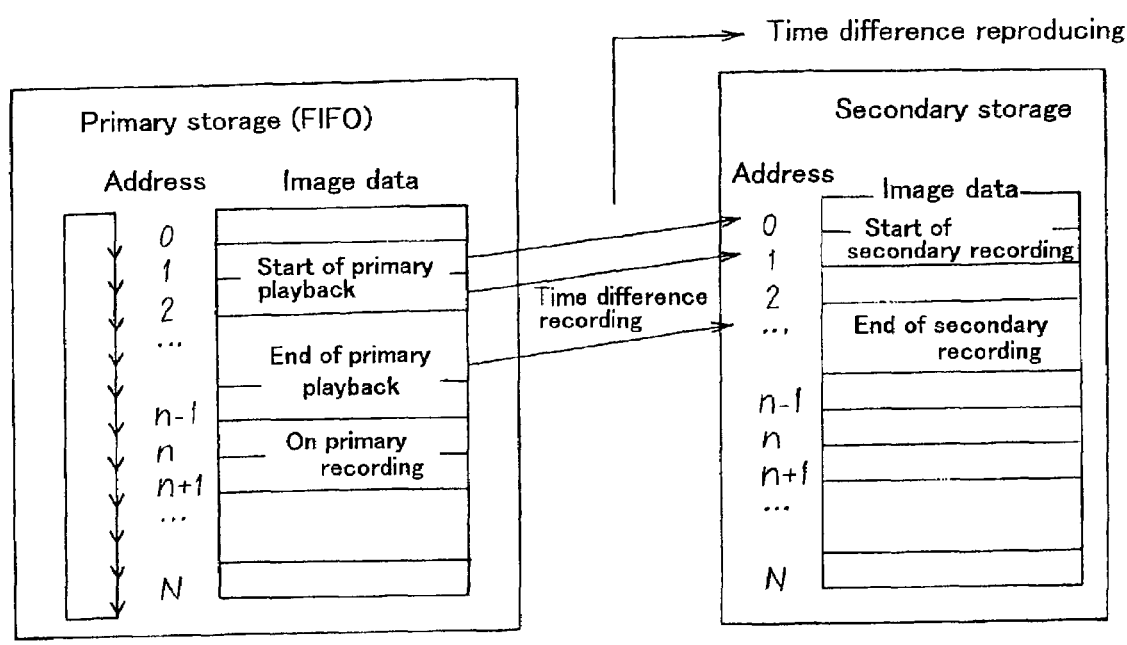
FIG. 6 is a diagram illustrative of a recording, operation of the broadcast video image recording apparatus shown in FIG. 2.

FIGS. 5 and 6 illustrate the manner in which video image data is played back from the primary storage unit 2 and recorded into the secondary storage unit 3. In the primary storage unit 2, the addresses are cyclically incremented to store video image data according to the FIFO sequence. While video image data is being recorded into the primary storage unit 2, previously recorded video image data is played back from the primary storage unit 2. Video image data for every minute is played back from the primary storage unit 2 and recorded into the secondary storage unit 3 after the video image data has started to be played back until its playback is ended.

Each of the primary storage management table 14 and the secondary storage management table 15 is capable of holding data for 2 hours. It is assumed that the present time is "9:16" and broadcast video image data is overwriting the video image data recorded at "7:16" two hours ago in the primary storage unit 2. FIG. 5 shows that there are a primary storage playback request and a secondary storage recording request for the video image data for 14 minutes of "9:01–9:14".

The secondary storage management table 15 holds times, secondary storage unit addresses, and information indicative of whether there is recorded data or not. The information indicative of whether there is recorded data or not is used to decide whether the data should be overwritten or not. As shown in FIG. 5, a recording table 15-1 holds recording titles, times, and ranges of recording addresses in the secondary storage unit 3. The recording table 15-1 is used to recognize remaining data not recorded.

FIG. 5 shows that the video image data from "9:01", 15 minutes back from the present time "9:16", is being played back from the primary storage unit 2 and recorded into the secondary storage unit 3. This means that the video image data is recorded from the primary storage unit 2 into the secondary storage unit 3 with a 15-minute time difference. If the video image data played back from the primary storage unit 2 is directly outputted for display, then the user can see video images broadcast 15 minutes ago. This means that even if the user gets a certain time late for a broadcast program, the user is still able to see the program after the time.

The video image data recorded in the secondary storage unit 3 can be played back in response to a playback request from the request unit 4.

Figure 7:
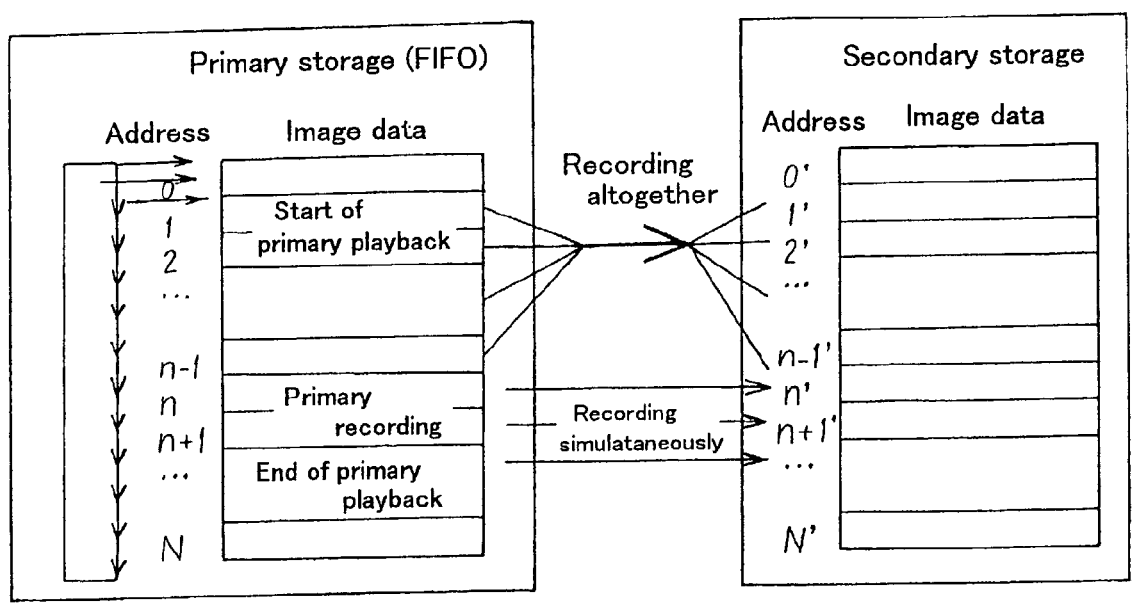
FIG. 7 is a diagram illustrative of another recording operation of the broadcast video image recording apparatus shown in FIG. 2.

FIG. 7 illustrates another recording operation of the broadcast video image recording apparatus shown in FIG. 2. In FIG. 7, the end time for the playback of video image data from the primary storage unit 2 is behind the time at which video image data is being recorded in the primary storage unit 2. The recording operation shown in FIG. 7 differs from the recording operation shown in FIG. 5 with respect to two details. First, in the recording operation shown in FIG. 5, video image data is played back with time from the primary storage unit 2 from the start time to the end time, and recorded into the secondary storage unit 3 with a time difference from the present time. According to the recording operation shown in FIG. 7, on the other hand, video image data already recorded in the primary storage unit 2 up to the time when video image data is being recorded is altogether played back from the primary storage unit 2 and recorded into the secondary storage unit 3. Therefore, the time required to record video image data into the secondary storage unit 3 can be reduced.

Secondly, in the recording operation shown in FIG. 5, video image data recorded in the secondary storage unit 3 is a certain time behind video image data recorded in the primary storage unit 2. According to the recording operation shown in FIG. 7, however, video image data is recorded simultaneously into the primary storage unit 2 and the secondary storage unit 3 after the recording of video image data in the primary storage unit 2 until the playback of video image data from the primary storage unit 2 is over. Consequently, the recording of video image data into the secondary storage unit 3 is finished when the playback of video image data from the primary storage unit 2 is over.

Figure 4:
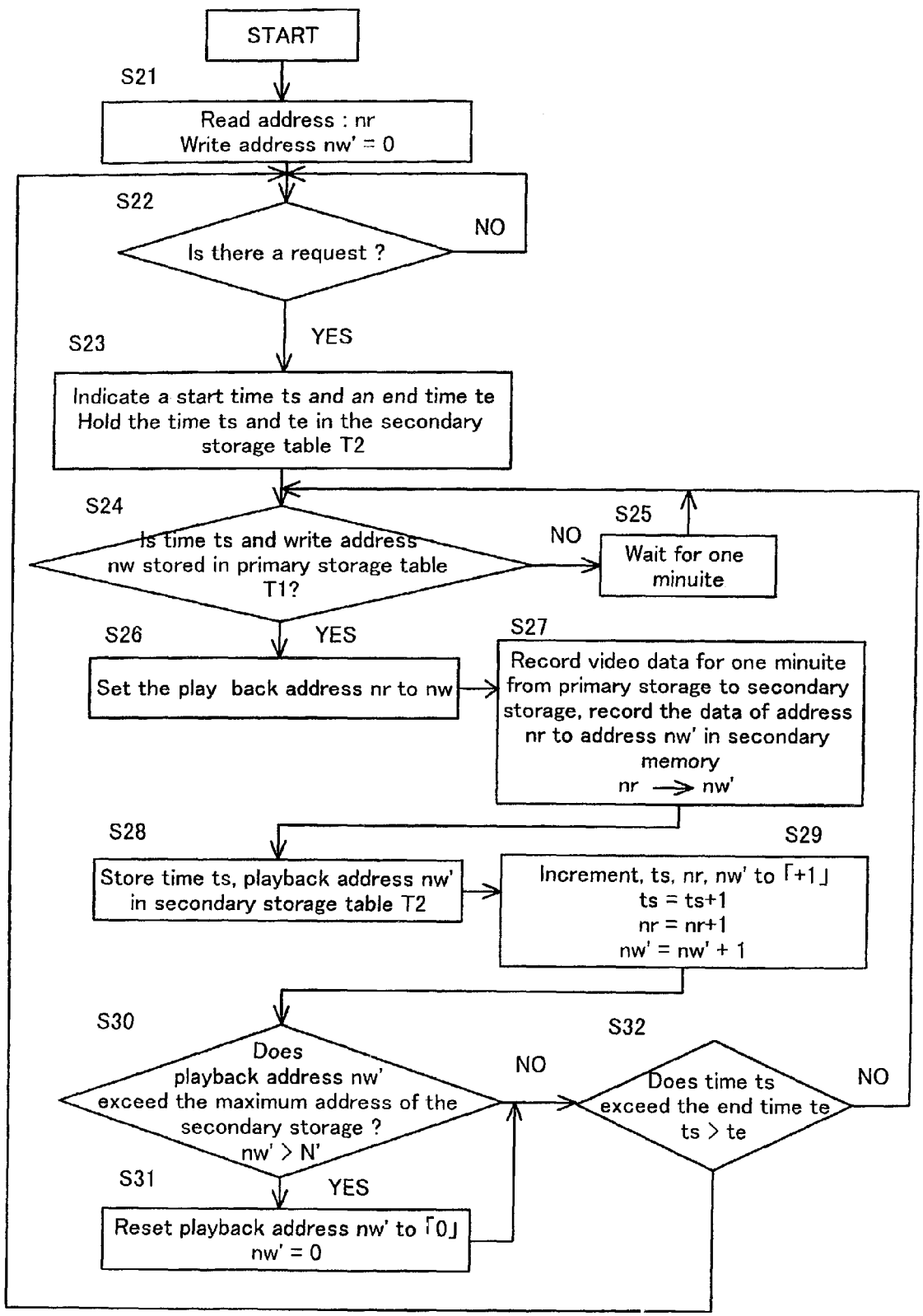
FIG. 4 is a flowchart of a secondary storing process of the control unit of the broadcast video image recording apparatus shown in FIG. 2.

In the operation sequence shown in FIG. 7, steps S26–S29 shown in FIG. 4 are executed simultaneously, but not in synchronism with the timer, while video image data is being recorded. After the recording of video image data, steps S26–S29 are executed in synchronism with the timer insofar as the recording capability of the secondary storage unit 3 is greater than the recording capability of the primary storage unit 2.

Figure 8:
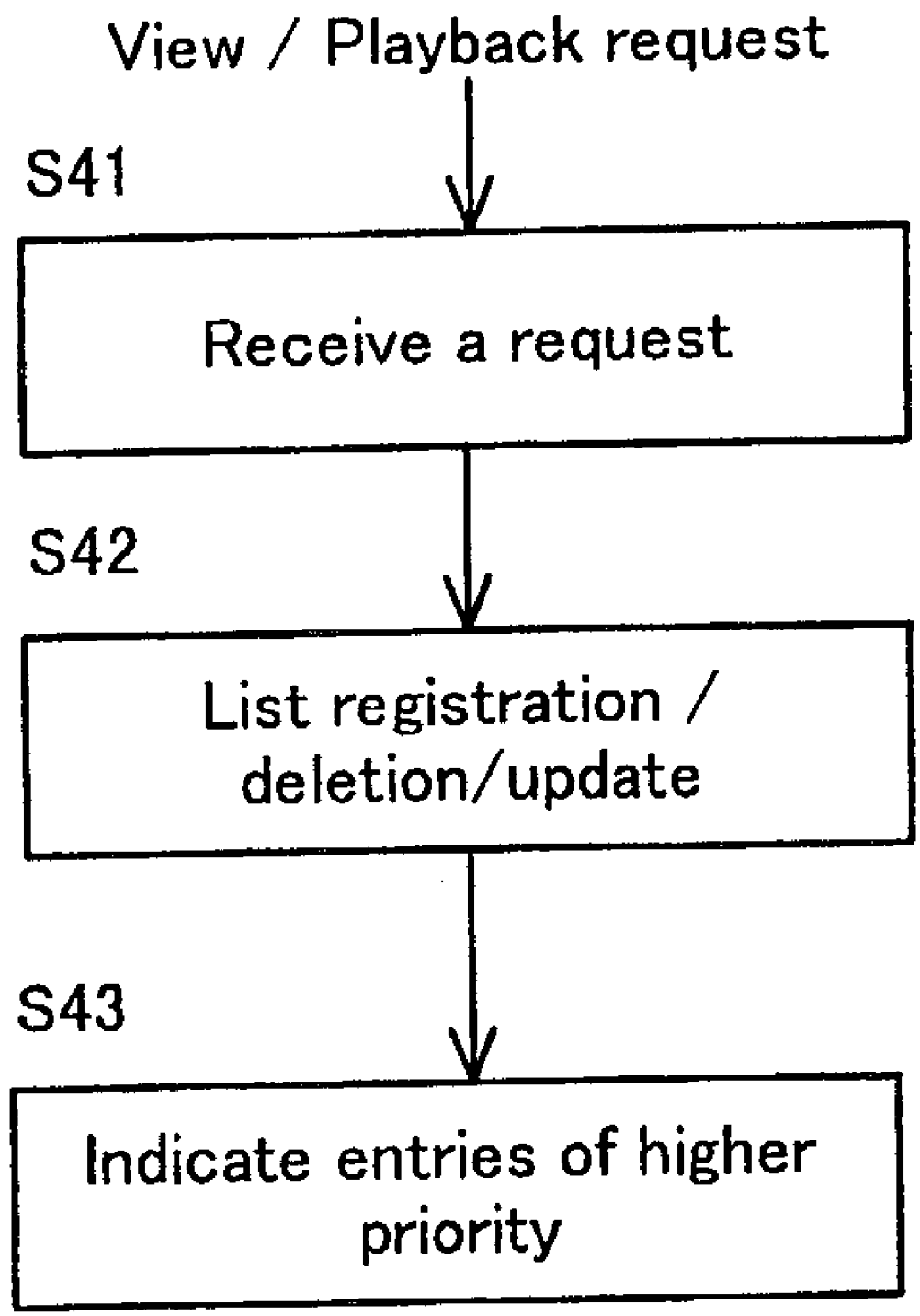
FIG. 8 is a flowchart of an automatic indicating process of the control unit of the broadcast video image recording apparatus shown in FIG. 2.

FIG. 8 shows an automatic indicating process of the view/playback history unit 16 and the automatic recording indicator 17 of the broadcast video image recording apparatus shown in FIG. 2.

The automatic indicating process of the view/playback history unit 16 and the automatic recording indicator 17 will be described below with reference to FIG. 8. Numerals each with a prefix S represent step numbers.

(S41) A view/playback request entered manually by the user is received from the request unit 4.

Figure 9:
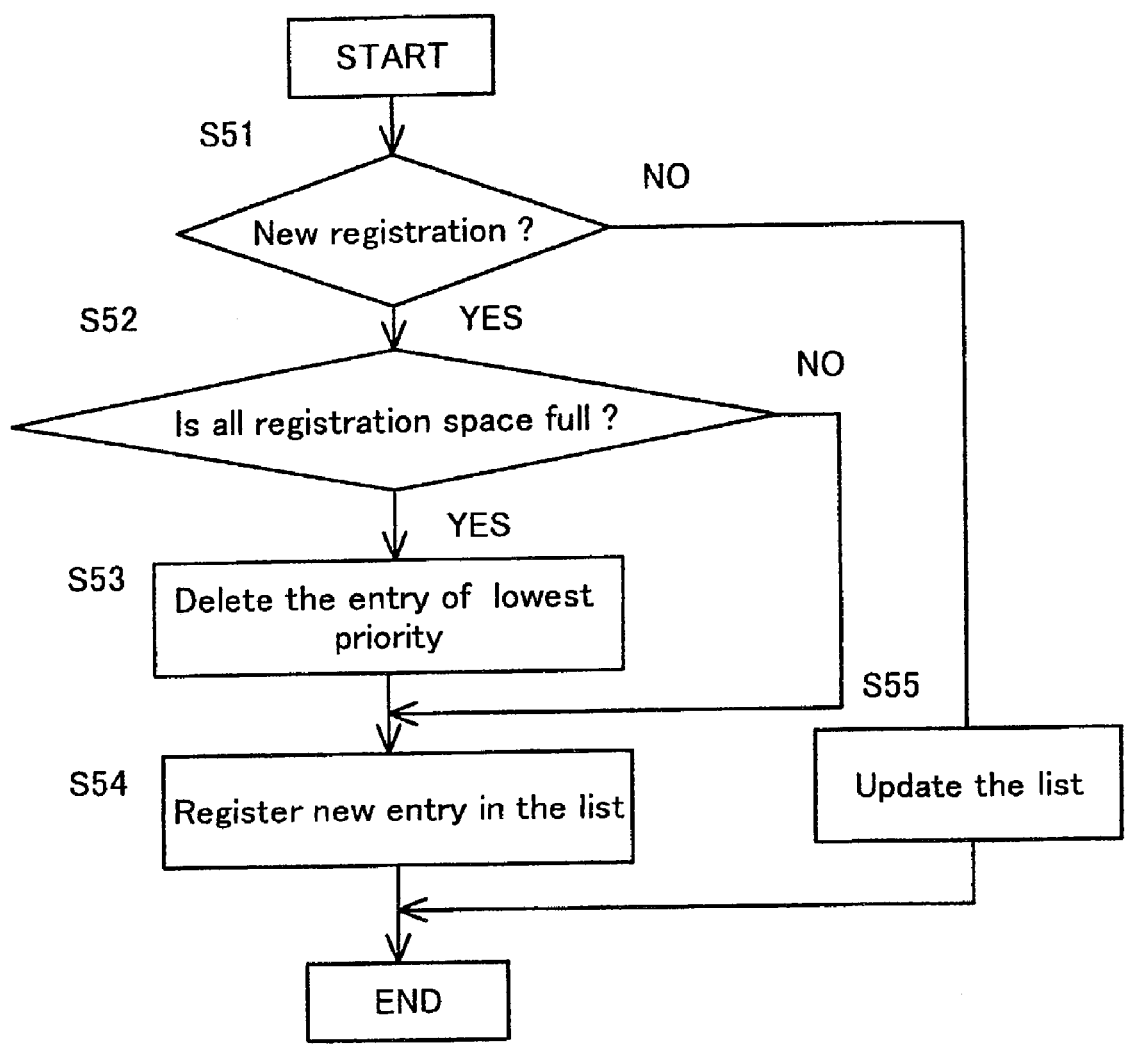
FIG. 9 is a flowchart of a list updating sequence in the automatic indicating process shown in FIG. 8.

(S42) The received view/playback request is registered in a list which will be described later on with reference to FIG. 9. Specifically, an entry in the list is deleted or the list is updated according to the view/playback request.

(S43) Entries of higher priority in the list, e.g., five entries of higher priority in the list, are indicated.

In this manner, a list is generated depending on how the user views and plays back broadcast programs, and entries are continuously deleted from the list or the list is continuously updated. Based on the list, video images which the user wants to see are automatically indicated for recording.

The list updating sequence in the automatic indicating process shown in FIG. 8 will be described below with reference to FIG. 9. Numerals each with a prefix S represent step numbers.

(S51) It is decided whether the view/playback request represents a new registration in the list or not based on how entries are registered in the list. If the view/playback request represents a new registration, then control proceeds step S52. If the view/playback request does not represent a new registration, then control jumps to step S55.

(S52) It is decided whether all registration spaces in the list are full or not. If all registration spaces in the list are full, then control goes to step S53. If the list is not full, then control jumps to step S54.

(S53) Because all registration spaces in the list are full, the entry of lowest priority is deleted from the list.

(S54) An entry is registered in the list according to processes shown in FIGS. 10 through 13.

(S55) The list is updated according to the processes shown in FIGS. 10 through 13.

FIGS. 10 through 12 show three lists by way of example. Each of the lists contains an order, days, channels, start times, end times, program titles, character names, and genres.

In FIG. 10, a list updating process called MTF (Move To Front) is employed. As also shown in FIG. 13, a newly registered program is put in a location of highest priority in the list. When a program is updated, it is also moved to the location of highest priority in the list. According to this list updating process, a program that is viewed or played back most recently can be indicated with highest priority, and no frequency counting is needed. This list updating process is effective where the user's tendency changes in a relatively short period of time.

In FIG. 11, a list updating process called Transport is employed. As also shown in FIG. 13, a newly registered program is put in a location of lowest priority in the list. When a program is updated, it is exchanged for an adjacent program of higher priority, and no frequency counting is needed. This list updating process is effective where the user's tendency does not change for a relatively long period of time.

According to a list updating process shown in FIG. 12, a newly registered program is put in a location of lowest priority in the list, as also shown in FIG. 13. The list is updated depending on the frequency of programs that have been viewed or played back. This list updating process needs frequency counting, but can accurately reflect the preference of the user.

In this fashion, programs can be indicated both manually by the user and based on an automatic predicting process without the user's manual intervention. According to the user's manual program indicating process, programs can be indicated using days, times, and channels, or G codes or EPG (Electronic Program Guide) based on characters, etc.

According to the automatic predicting process without the user's manual intervention, the list contains information about the tendency of programs viewed in the past by the user and the tendency of programs recorded in the past by the secondary storage unit, and programs to be indicated for recording are automatically predicted from statistic data about the various parameters in the list. For example, five programs of highest priority are indicated for recording in the order of descending probability.

Figure 14:
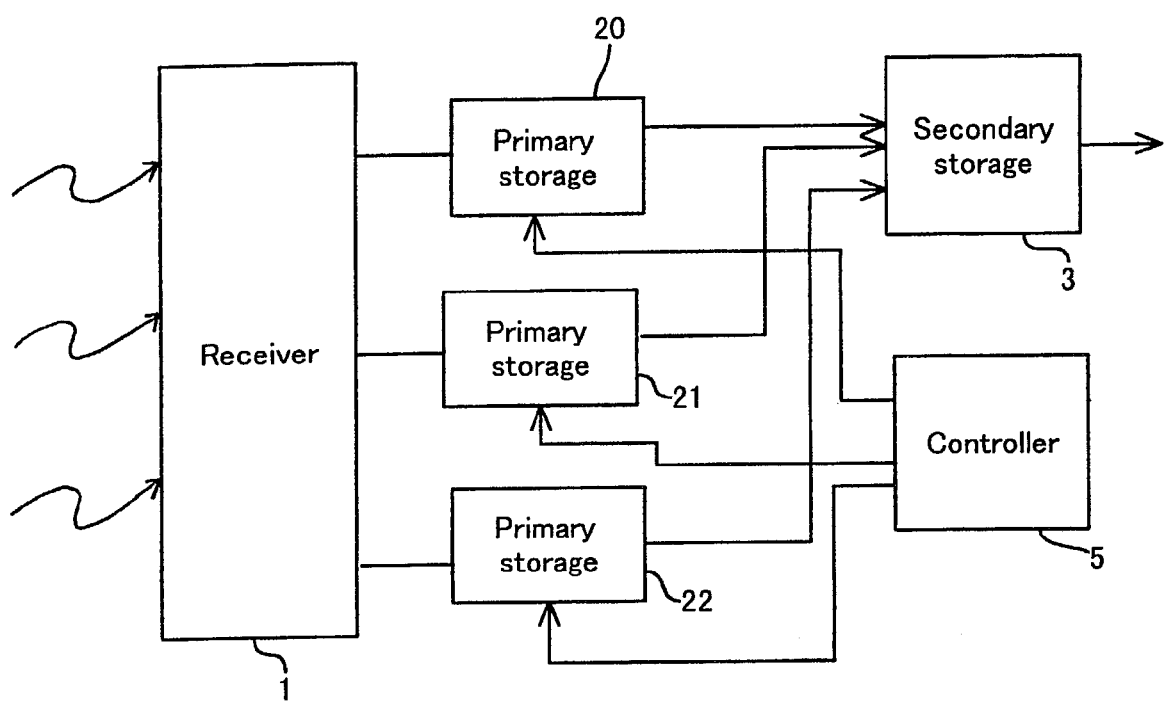
FIG. 14 is a block diagram of a broadcast video image recording apparatus according to another embodiment of the present invention.
Figure 15:
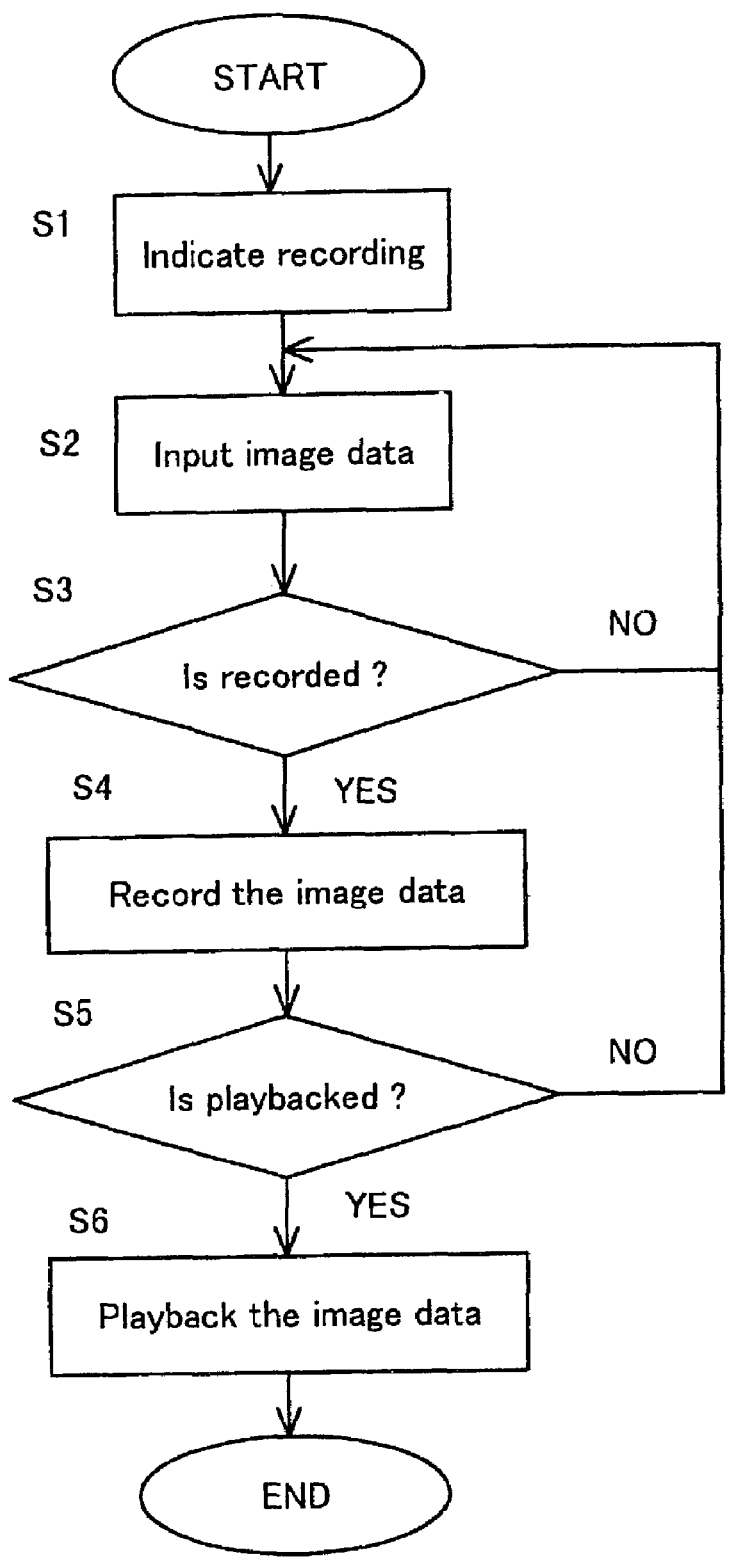
FIG. 15 is a flowchart of an operation sequence of a conventional system for recording digital video images.

FIG. 14 shows in block form a broadcast video image recording apparatus according to another embodiment of the present invention. Those parts of the broadcast video image recording apparatus shown in FIG. 14 which are identical to those shown in FIG. 2 are denoted by identical reference numerals. The broadcast video image recording apparatus shown in FIG. 14 has three primary storage units 20, 21, 22 provided for respective channels for storing video image data broadcast in the channels. In the illustrated embodiment, therefore, the broadcast video image recording apparatus can simultaneously record video image data in a plurality of channels at the same time.

Similarly, if the single primary storage memory 2 shown in FIG. 1 capable of simultaneously storing video image data in a plurality of channels at the same time, then the broadcast video image recording apparatus shown in FIG. 1 can simultaneously record video image data in a plurality of channels at the same time. When video image data is to be deleted from the primary storage unit 2, oldest video image data is deleted from the primary storage unit 2.

If video image data in a plurality of channels have the same start time, then video image data of the oldest end time is deleted at first thereby to keep the latest video image data in the primary storage unit. According to another process, video image data of the latest end time is deleted, i.e., video image data of the longest recording time is deleted, at first thereby to keep an available storage capacity in the primary storage unit 2. According to still another process, older video image data may be deleted at first from the list, or alternatively, video image data of less importance may be deleted at first from the list.

Likewise, if video image data in a plurality of channels have the same start time, then video image data of the oldest end time, i.e., video image data of the shortest recording time, is recorded at first into the second storage unit. According to another process, video image data of the latest end time is recorded, i.e., video image data of the longest recording time is recorded, at first into the primary storage unit 2. According to still another process, newer video image data may be recorded at first into the secondary storage unit, or alternatively, video image data of greater importance may be recorded at first into the secondary storage unit.

While each of the primary and secondary storage units has been illustrated as comprising a magnetic disk unit or an optical disk unit in the above embodiments, it may be a digital video disk unit or a video tape unit.

In the above embodiments, video image data can be indicated for recording in the secondary storage unit both manually and automatically. However, the principles of the present invention are applicable to an apparatus which allows video image data to be indicated for recording in the secondary storage unit either manually or automatically, or which has a switch for selecting a manual or automatic indication of programs to be recorded.

The present invention offers the following advantages:

(1) Broadcast video images are stored in a first storage unit at all times, and video images stored in the first storage unit are read and stored in a second storage unit at a time indicated for recording. Therefore, video images that have been broadcast in the past can be recorded.

(2) Even if a recording time gets behind schedule, desired broadcast video images which have been stored in the first storage unit can be transferred from the first storage unit to the second storage unit at the delayed time. Therefore, the desired broadcast video images can be recorded in the second storage unit.

Although certain preferred embodiments of the present invention have been shown and described in detail, it should be understood that various changes and modifications may be made therein without departing from the scope of the appended claims.

What is claimed is:

1. A broadcast video image recording apparatus to record broadcast video image data, comprising:
   a receiver receiving broadcast video image data to be viewed;
   a first storage unit storing said received broadcast video image data according to a FIFO sequence;
   a second storage unit storing an indicated video image data in said stored received broadcast video image data of said first storage unit;
   indicating means for indicating said video image data to be played back; and
   a control unit controlling said first storage unit to store said received broadcast video image data, searching and reading said indicated video image data, which has been stored in said first storage unit, and storing the indicated video image data in said second storage unit according to said indication of said indicating means,
   wherein said indicating means comprises means for automatic determining of the video image data to be played back from a list of information indicative of how the video image data has been stored into said second storage unit.

2. The broadcast video image recording apparatus according to claim 1, wherein said indicating means comprises means for automatic determining of the video image data which is recorded with a highest priority in said list, as the video image data to be played back.

3. The broadcast video image recording apparatus according to claim 2, wherein said indicating means further comprises means for placing video image data which has been recorded most recently in a location of highest priority in said list.

4. The broadcast video image recording apparatus according to claim 2, wherein said indicating means further comprises means for updating said list in order to impart a highest priority to the video image data which has been recorded most recently.

5. A broadcast video image recording apparatus for recording broadcast video image data comprising:
   a receiver receiving broadcast video image data for viewing;
   a first storage unit storing said received broadcast video image data according to a FIFO sequence;
   a second storage unit storing an indicated video image data in said stored received broadcast image data of said first storage unit;
   indicating means for indicating said video image data to be played back; and
   a control unit controlling said first storage unit so as to store said received broadcast video image, and for searching and reading said indicated video image data which have been stored in said first storage unit, and storing the indicated video image data in said second storage unit according to said indication of said indicating means and wherein said indicating means comprises means for automatic determining of the video image data to be played back from a list of information indicative of how the video image data has been stored into said second storage unit.

* * * * *